(12) United States Patent
Yang

(10) Patent No.: US 7,016,404 B2
(45) Date of Patent: Mar. 21, 2006

(54) AUTOMATIC FREQUENCY CORRECTION FOR MOBILE RADIO RECEIVERS

(75) Inventor: Bin Yang, Stuttgart (DE)

(73) Assignee: Infineon Technologies AG, Munich (DE)

( * ) Notice: Subject to any disclaimer, the term of this patent is extended or adjusted under 35 U.S.C. 154(b) by 463 days.

(21) Appl. No.: 10/379,988

(22) Filed: Mar. 5, 2003

(65) Prior Publication Data

US 2003/0171102 A1 Sep. 11, 2003

Related U.S. Application Data

(63) Continuation of application No. PCT/DE01/03389, filed on Aug. 30, 2001.

(30) Foreign Application Priority Data

Sep. 5, 2000 (DE) .............................. 100 43 743

(51) Int. Cl.
*H04B 17/02* (2006.01)
*H04B 1/18* (2006.01)

(52) U.S. Cl. .................. 375/229; 455/139; 455/192.2; 455/226.1; 455/63.1; 375/231; 375/344

(58) Field of Classification Search ............... 455/63.1, 455/67.11, 67.16, 139, 182.2, 192.2, 226.1; 375/231, 233, 344
See application file for complete search history.

(56) References Cited

U.S. PATENT DOCUMENTS

| | | | | |
|---|---|---|---|---|
| 5,199,047 A | * | 3/1993 | Koch | ......................... 375/231 |
| 5,537,438 A | * | 7/1996 | Mourot et al. | ............... 375/231 |
| 6,347,126 B1 | * | 2/2002 | Nagayasu et al. | ........... 375/344 |
| 6,363,102 B1 | * | 3/2002 | Ling et al. | ................... 375/147 |
| 6,370,205 B1 | * | 4/2002 | Lindoff et al. | .............. 375/319 |
| 6,614,860 B1 | * | 9/2003 | Piirainen | ..................... 375/341 |
| 6,704,377 B1 | * | 3/2004 | Hsuan | ......................... 375/346 |
| 2002/0098795 A1 | * | 7/2002 | Brede et al. | ................ 455/3.01 |

FOREIGN PATENT DOCUMENTS

| | | |
|---|---|---|
| DE | 41 30 863 A1 | 3/1993 |
| DE | 41 30 864 C2 | 3/1993 |
| DE | 41 30 865 A1 | 3/1993 |
| DE | 43 11 655 C1 | 4/1994 |
| DE | 199 48 899 A1 | 4/2001 |
| EP | 0 648 037 A1 | 4/1995 |
| WO | WO 98/34357 | 8/1998 |
| WO | WO 00/54431 | 9/2000 |

OTHER PUBLICATIONS

Luise, M. et al.: "Carrier Frequency Recovery in All-Digital Modems for Burst-Mode Transmissions", IEEE Transactions on Communications, vol. 43, No. 43, Feb./Apr. 1995, pp. 1169-1178.

* cited by examiner

Primary Examiner—Simon Nguyen
(74) Attorney, Agent, or Firm—Laurence A. Greenberg; Werner H. Stemer; Ralph E. Locher

(57) ABSTRACT

A device and a method for automatic frequency correction are used in mobile radio receivers. After channel estimation has been performed, the phases of the received data symbols are analyzed in order to determine the frequency shift. Following the phase analysis, a phase correction of the received data symbols is performed.

24 Claims, 2 Drawing Sheets

AUTOMATIC FREQUENCY CORRECTION FOR MOBILE RADIO RECEIVERS

CROSS-REFERENCE TO RELATED APPLICATION

This application is a continuation of copending International Application No. PCT/DE01/03389, filed Aug. 30, 2001, which designated the United States and was not published in English.

BACKGROUND OF THE INVENTION

FIELD OF THE INVENTION

The invention relates to a receiving unit for mobile radio transmission and to a method for correcting the frequency error in the mobile radio transmission of data symbols.

When data symbols are transmitted via a mobile radio channel, there is a plurality of error sources that, together, determine the bit error rate related to a particular transmitting power. The most important error source hitherto is the noise.

In addition, a so-called frequency error also significantly contributes to the bit error rate. Frequency error is the error caused by different oscillator frequencies at the transmitting and receiving ends. The mismatch between the oscillator frequencies at the transmitting end and at the receiving end can be caused by manufacturing tolerances in the oscillators and oscillating crystals used. The expenditure necessary for providing a high-precision frequency standard was feasible in the base station but in the mobile station the oscillators used exhibit considerable frequency fluctuations because of cost optimization.

In addition, the Doppler effect contributes to the frequency error. A relative movement between the transmitter and the receiver leads to a frequency shift in the signals transmitted. Assuming that a mobile radio subscriber is telephoning from his car that is moving at a speed of 200 km/h, at a transmitting frequency of 900 MHz, this results in a maximum Doppler shift of $$\frac{200 \text{ km/h}}{3 \cdot 10^5 \text{ km/s}} \cdot 900 \text{ MHz} \approx 167 \text{ Hz}$$

In the mobile radio standard global system for mobile communications (GSM), a relatively low signal/noise ratio of less than 10 dB is used. The noise is thus the dominant error source in this case. The Gaussian minimum shift keying (GMSK) modulation used in the GSM standard uses a signal space with signal points +1 and −1. Since these two signal points have a phase difference of 180°, small phase or frequency errors will not lead to an increase in the bit error rate. Because of the GMSK modulation, GSM is, therefore, relatively resistant to frequency errors.

The situation is different in the general packet radio service (GPRS) case since a higher signal/noise ratio of more than 15 dB is used here. This provides for data transmission rates of up to 21.4 kbit/s. Noise is of less significance as an error source in this case whereas the frequency error, in particular the Doppler shift, becomes the dominant error source.

As an intermediate standard between GSM/GPRS and universal mobile telecommunications system (UMTS), the EDGE (Enhanced Data Rates for GSM Evolution) standard and the associated EGPRS (Enhanced GPRS) packet service has been defined. EDGE is a time division multiple access (TDMA) method that has already been changed from the GMSK modulation to the 8-PSK modulation. In the 8-PSK modulation, a signal space with eight signal points is used and the phase difference between the individual signal points is 45°. For this reason, even small phase or frequency errors have an interfering effect and cause a significant increase in the bit error rate.

For this reason, measures must be taken for correcting the frequency error.

For this purpose, it has been proposed to continuously adapt the channel coefficients determined by the channel estimator for modeling the transmission channel to the current transmission situation by a so-called channel checker. However, it has been found that no effective correction of the frequency error can be achieved by regularly redetermining the channel coefficients.

In International Patent Disclosure WO 98/34357 A1, a receiving unit for mobile radio transmission with a Doppler correction stage is described. For this purpose, the receiving unit exhibits a channel estimator which is supplied with the received data and which calculates from these the channel coefficients. Means for frequency estimation determine the frequency shift for each data bit and means for frequency correction correct the phases of the received data symbols by means of the frequency shifts determined. Finally, a channel equalizer equalizes the phase-corrected data symbols by using the channel coefficients.

The subject matter of Published, European Patent Application EP 0 648 037 A1 relates to the demodulation of received signals. The demodulation is performed by a reference phase that is obtained from a regression analysis of the phases of the received signals.

In the document titled "Carrier Frequency Recovery in All-Digital Modems for Burst-Mode Transmissions" by M. Luise and R. Reggiannini, published in IEEE Transactions on Communications, 1995, Volume 43, pages 1169–1178, an algorithm for calculating the frequency shift of a carrier frequency is described. The frequency shift is calculated from a sequence of phase differences between received data symbols and the frequency-error-free data symbols derived from a training sequence.

SUMMARY OF THE INVENTION

It is accordingly an object of the invention to provide an automatic frequency correction for mobile radio receivers that overcome the above-mentioned disadvantages of the prior art devices and methods of this general type, which enable the bit error rate to be reduced in the mobile radio transmission with the transmitting power remaining the same.

With the foregoing and other objects in view there is provided, in accordance with the invention, a receiving unit for mobile radio transmission. The receiving unit contains a channel estimator for determining channel coefficients $h_0, \ldots h_L$ for modeling a transmission channel, where L is a channel memory. A frequency estimation unit is connected to the channel estimator. The frequency estimation unit determines a sequence of phase differences p(k) between received data symbols x(k) and frequency-error-free data symbols y(k) derived from a training sequence and also determines a frequency shift $\Delta\omega$ of the received data symbols x(k) from the sequence of phase differences p(k). The frequency estimation unit performs in a case where a sequence value of the sequence of phase differences p(k)

deviates from a mean value $p_{mean}$ of the sequence of phase differences by more than a predetermined threshold value, a smoothing of the sequence of phase differences p(k) by replacing the sequence value with a linear combination of a preceding sequence value p(k−1) and of a subsequent sequence value p(k+1). The frequency estimation unit further performs a linear regression analysis of the sequence of phase differences p(k) plotted against time and determines the frequency shift $\Delta\omega$ from a slope of the linear regression analysis. A frequency correction unit is provided for correcting a phase of the received data symbols x(k) in dependence on the frequency shift $\Delta\omega$ resulting in phase-corrected data symbols $\bar{x}(k)$. The frequency correction unit is connected to the frequency estimation unit. A channel equalizer is provided for equalizing the phase-corrected data symbols $\bar{x}(k)$ using the channel coefficients $h_0, \ldots h_L$ determined by the channel estimator. The channel equalizer is connected to the channel estimator and to the frequency correction unit.

The receiving unit according to the invention has a channel estimator that determines the channel coefficients $h_0, \ldots h_L$ for modeling the transmission channel, where L denotes the channel memory. Furthermore, the receiving unit has means for frequency estimation, for example a frequency estimation unit and/or software, which determines the frequency shift $\Delta\omega$ of the received data symbols x(k). The means for frequency correction, for example a frequency correction unit and/or software, corrects the phase of the received data symbols in dependence on the analytically determined frequency shift $\Delta\omega$. Furthermore, the receiving unit contains a channel equalizer that equalizes the phase-corrected data symbols in accordance with the channel coefficients determined by the channel estimator.

According to the invention, the channel coefficients are determined by the data symbols originally received whereas the channel equalization is also based on explicitly phase-corrected data symbols. To be able to perform the phase correction of the data symbols, the frequency shift $\Delta\omega$ is determined analytically. The phases of the received data symbols are corrected in accordance with the magnitude of the frequency shift $\Delta\omega$.

The frequency correction is performed between channel estimation and channel equalization in the solution according to the invention. An effective compensation for the frequency error can only be achieved if the channel estimator processes the original data symbols and the channel equalizer equalizes the phase-corrected data symbols. The solution according to the invention provides for a relevant decrease in the bit error rate, the transmitting power remaining the same.

Correspondingly, a predetermined bit error rate can be achieved with much lower transmitting power. The automatic frequency correction according to the invention allows the transmitting power to be decreased by several dB at a predetermined bit error rate.

According to the invention, the means for frequency estimation determine a sequence of phase differences p(k) between the received data symbols x(k) and the frequency-error-free data symbols y(k) derived from a training sequence. From the sequence of phase differences p(k), the frequency shift $\Delta\omega$ is determined.

To be able to determine the respective phase error of the received data symbols, the frequency-error-free data symbol sequence y(k) is needed. The training sequence transmitted together with each burst is used for determining the frequency-error-free data symbols y(k). With regard to the training sequence, both the basic transmitted training symbols and the training symbols actually received are known at the receiver end and, from these, a certain number of frequency-error-free data symbols y(k) can be determined at the receiver end.

All standards such as GSM, GPRS, EDGE, EGPRS provide for a training sequence to be transmitted with each data burst. Thus, the training sequence needed for the solution according to the invention already exists in the various standards so that the solution according to the invention does not require any additional complexity. The training sequence already provided is only used in a new way for determining the sequence of frequency-error-free data symbols y(k).

The means for frequency estimation also perform a linear regression analysis of the sequence of phase differences p(k), plotted against time, and determine the frequency shift $\Delta\omega$ from a slope. A linear increase/decrease of the sequence of phase differences p(k) with increasing k (k is a measure of the time) corresponds to a constant frequency offset $\Delta\omega$. The greater $\Delta\omega$, the more the sequence of phase differences p(k) will change with time. The slope of the sequence of phase differences p(k) is, therefore, a measure of the frequency shift $\Delta\omega$. The slope can be determined by a linear regression analysis (method of least error squares).

Assuming a linear relationship between the sequence of phase differences p(k) and the frequency shift $\Delta\omega$, both the contribution of a permanent frequency detuning between the transmitter and the receiver and the contribution of the Doppler shift are covered. Higher-order terms contribute to the respective phase error to a much lesser extent and can, therefore, be neglected. The linear regression analysis can be performed with little computing effort.

It is of advantage here if a statistical smoothing of the sequence of phase differences p(k) is performed before the linear regression analysis is carried out. The values of the sequence of phase differences p(k) obtained essentially cover the phase deviation caused by the frequency error correctly. However, experience shows that some values of the sequence of phase differences p(k) are located far away from the variation exhibited by the other values. These runaways considerably degrade the result of the calculation of the frequency shift $\Delta\omega$. It is of advantage, therefore, to smooth the sequence of phase differences p(k) statistically and to ignore the runaway values in the evaluation.

According to the invention, in the case where a sequence value of the sequence of phase differences p(k) deviates from a mean value $p_{mean}$ of the sequence by more than a predetermined threshold value, a smoothing of the sequence of phase differences p(k) is performed by replacing a corresponding sequence value p(k) by a linear combination of the preceding sequence value p(k−1) and of a subsequent sequence value p(k+1).

Using the mean value $p_{mean}$ and a predetermined threshold value, the values of the sequence of phase differences p(k) which deviate greatly can be easily identified. According to the invention, each greatly deviating sequence value of the sequence of phase differences p(k) is replaced by a linear combination of p(k−1) and p(k+1).

According to an advantageous embodiment of the invention, the means for frequency estimation generate the frequency-error-free data symbols y(k) by remodulation of the undistorted training symbols $s(K_1), \ldots s(K_2)$ with the channel coefficients $h_0, \ldots h_L$. $s(K_1)$ is here a first training symbol and $s(K_2)$ is a last training symbol of the undistorted training sequence.

At the receiver end, both the basic transmitted training symbols $s(K_1), \ldots s(K_2)$ and the received training symbols $x(K_1), \ldots, x(K_2)$ of the training sequence are known. In addition, the channel coefficients $h_0, \ldots h_L$, which mathematically model the transmission channel and are determined by channel estimation, are available at the receiver end. The information can be used for calculating how the transmission channel would transmit the known training symbols $s(K_1), \ldots s(K_2)$ if there were no frequency error. This method called "remodulation" can be used for calculating a number of ideal, frequency-error-free data symbols $y(k)$ on the basis of the training symbols. Thus, the frequency-error-free data symbols $y(k)$ are not data symbols actually received but data symbols mathematically synthesized by using the channel model as a basis.

It is of advantage to perform the remodulation of the training symbols $s(K_1), \ldots s(K_2)$ with the channel coefficients $h_0, \ldots h_L$ in accordance with the formula $$y(k) = \sum_{i=0}^{L} h_i \cdot s(k-i)$$

where $k = K_1 + L, \ldots K_2$.

Writing out this formula explicitly in full, it becomes clear how the undistorted data symbols $s(K_1), \ldots s(K_2)$ of the training sequence are combined for delivering the frequency-error-free sequence $y(k)$:

$$y(K_1 + L) = h_0 \cdot s(K_1 + L) + \ldots + h_L \cdot s(K_1)$$
$$\vdots \qquad \vdots$$
$$y(K_2) = h_0 \cdot s(K_2) + \ldots + h_L \cdot s(K_2 - L)$$

Because of the channel memory L, it is not only the associated value $s(K_1+L)$ but also the past values $s(K_1+L-1), \ldots s(K_1)$ which contribute to the value $y(K_1+L)$. Because of the channel memory L, only $(K_2-K_1-L+1)$ frequency-error-free values $y(K_1+L), \ldots y(K_2)$ can be generated from the $(K_2-K_1+1)$ initial symbols $s(K_1), \ldots s(K_2)$. The values of $y(k)$ can be calculated within a short time without great computing effort at the receiving end.

It is of advantage to generate the sequence of phase differences $p(k)$ by evaluating the phase of the expression $$\frac{x(k)}{y(k)}$$

or of the expression $$\frac{y(k)}{x(k)}.$$

Because of the quotient being formed, the phase of the expression $$\frac{x(k)}{y(k)}$$

corresponds to the difference between the phases of $x(k)$ and $y(k)$ and thus to the respective phase deviation.

As an alternative, it is of advantage to generate the sequence of phase differences $p(k)$ by evaluating the phase of the expression $$x^*(k) \cdot y(k)$$

or of the expression $$x(k) \cdot y^*(k),$$

where $x^*(k), y^*(k)$ are the complex conjugates of $x(k), y(k)$. The phases of $x^*(k)$ and of $x(k)$ differ by their sign. Thus, the phase of the expression $$x^*(k) \cdot y(k)$$

is obtained as the difference between the phases of $y(k)$ and $x(k)$.

Compared with the evaluation of $$\frac{y(k)}{x(k)}$$

the evaluation of the expression $x^*(k) \cdot y(k)$ has the advantage that a division consuming computing time can be avoided. No singularities can occur for the case $x(k)=0$ or $y(k)=0$.

In the smoothing of the sequence of phase differences $p(k)$, it is particularly appropriate that the sequence value which has deviated to much is replaced, by the arithmetic mean $$\frac{p(k-1) + p(k+1)}{2}$$

of the preceding sequence value and of the subsequent sequence value. This has the further advantage that the total number of sequence values in each case remains constant which facilitates the subsequent linear regression analysis.

It is of advantage if the means for frequency correction correct the phase of the received data symbols $x(k)$ by multiplying $x(k)$ by $$e^{-i\Delta\omega \cdot k}$$

The frequency shift $\Delta\omega$ causes a phase error that increases linearly with k and which can be corrected by a phase ramp function. For this purpose, the phase of a received data symbol $x(k)$ is corrected by $-\Delta\omega \cdot k$. For this purpose, each complex-valued data symbol $x(k)$ is multiplied by the complex sinusoidal signal $$e^{-i\Delta\omega \cdot k} = \cos(\Delta\omega \cdot k) - i \cdot \sin(\Delta\omega \cdot k)$$

This can be done in a simple manner by a sine/cosine coefficient table. As an alternative, the so-called CORDIC algorithm, which is described in Published, Non-Prosecuted German Patent Application DE 199 48 899 A1, titled "Verfahren und Schaltungsordnung zur digitalen Frequenzkorrektur eines Signals" [Method and Circuit Arrangement for the Digital Frequency Correction of a Signal], can also be used.

It is of advantage if the means for frequency correction corrects the phase of the received data symbols $x(k)$ by multiplying $x(k)$ by $$e^{-i\Delta\omega \cdot (k-K_0)}$$

where $K_0$ is the index of a data symbol belonging to the training sequence. The term $(k-K_0)$ makes it possible to achieve that the received data symbol $x(K_0)$ belonging to the training sequence is not changed by the phase correction factor.

Since, as a rule, $\Delta\omega \ll 2\pi$ holds true, the remaining data symbols $x(K_1), \ldots x(K_2)$ belonging to the training sequence are also changed only slightly by the phase correction factor $$e^{-i\Delta\omega(k-K_0)}$$

The phase-corrected data symbols $\bar{x}(K_1), \ldots \bar{x}(K_2)$ of the training sequence thus differ only slightly from the received training symbols $x(K_1), \ldots x(K_2)$. The channel estimation performed initially can still be used, therefore, even though, of course, the data symbols $x(K_1), \ldots x(K_2)$ with phase errors have been used in this channel estimation. The determination of the channel coefficients $h_0, \ldots h_L$ does not, therefore, need to be repeated. It is appropriate to define $$K_0 = \frac{K_1 + K_2}{2}$$

According to a further advantageous embodiment of the invention, the receiving unit decodes GMSK-modulated data symbols. This makes it possible to achieve a reduction in the bit error rate caused by frequency errors.

In particular, it is of advantage if the receiving unit decodes 8-PSK-modulated data symbols. In the 8-PSK modulation, a signal space with 8-level data symbols is used. The phase angle between adjacent signal space points is thus 45°. The phase errors can be considerably reduced by using the frequency error correction according to the invention with the 8-PSK modulation which thus provides for a higher hit ratio in the demodulation.

According to a further advantageous embodiment of the invention, the receiving unit decodes data symbols in the EDGE standard. The EDGE (Enhanced Data Rates for GSM Evolution) standard is a follow-up standard of GSM in which the 8-PSK modulation is used instead of the GMSK modulation. EDGE and, particularly, the EGPRS (Enhanced GPRS) service provide for a further increase in the data transmission rate. Using the frequency correction according to the invention makes it possible to largely eliminate frequency errors such as the Doppler shift.

With the foregoing and other objects in view there is further provided, in accordance with the invention, a method for correcting a frequency error in a mobile radio transmission of data symbols. The method includes determining channel coefficients $h_0, \ldots h_L$ for modeling a transmission channel, where L is a channel memory; determining a sequence of phase differences $p(k)$ between received data symbols $x(k)$ and a frequency-error-free data symbols $y(k)$ derived from an undistorted training sequence; and determining a frequency shift $\Delta\omega$ of the received data symbols $x(k)$ from the sequence of phase differences $p(k)$. The frequency phase shift $\Delta\omega$ is determined by smoothing the sequence of phase differences $p(k)$ for a case where a sequence value of the sequence of phase differences $p(k)$ deviates from a mean value $p_{mean}$ of the sequence of phase differences $p(k)$ by more than a predetermined threshold value, a corresponding sequence value of the sequence of phase differences $p(k)$ being replaced by a linear combination of a preceding sequence value $p(k-1)$ and of a subsequent sequence value $p(k+1)$ of the sequence of phase differences. A linear regression analysis of the sequence of phase differences $p(k)$ plotted against time is then performed. The frequency shift $\Delta\omega$ is determined from a slope obtained by the linear regression analysis. A phase of the received data symbols $x(k)$ is corrected in dependence on the frequency shift $\Delta\omega$ and results in phase-corrected data symbols $\bar{x}(k)$. The phase-corrected data symbols $\bar{x}(k)$ are equalized using the channel coefficients $h_0, \ldots h_L$.

Other features which are considered as characteristic for the invention are set forth in the appended claims.

Although the invention is illustrated and described herein as embodied in an automatic frequency correction for mobile radio receivers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
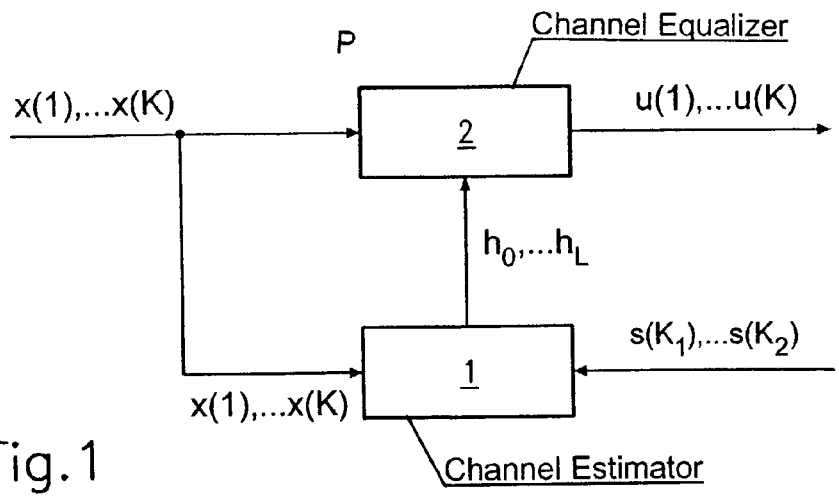
FIG. 1 is a block diagram of a receiving unit according to the prior art that contains a channel estimator and a channel equalizer.

Referring now to the figures of the drawing in detail and first, particularly, to FIG. 1 thereof, there is shown a receiving unit for TDMA systems according to the prior art, which contains a channel estimator 1 and a channel equalizer 2. Received data symbols $x(1), \ldots x(K)$ of a data burst are supplied to the channel estimator 1 and to the channel equalizer 2.

Figure 2:
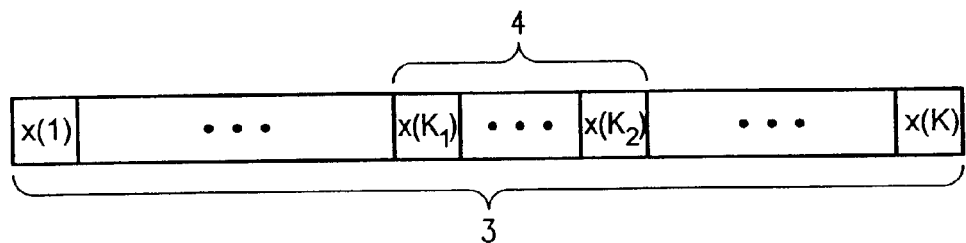
FIG. 2 is an illustration showing a structure of a burst of received data symbols.

The structure of a data burst is shown in FIG. 2. The data burst 3 contains the received data symbols $x(1) \ldots x(K)$ distorted by the transmission channel. With each data burst 3, a training sequence 4 is transmitted. The received training symbols $x(K_1), \ldots x(K_2)$ of the distorted training sequence 4 are a component of the received data burst 3. The basic training symbols $s(K_1), \ldots s(K_2)$ of an undistorted training sequence are known at the receiver end and are available to the channel estimator 1. The channel estimator 1 can determine the multi-path transmission characteristic of the transmission channel by a correlation analysis between the undistorted training sequence $s(K_1), \ldots s(K_2)$ and the received distorted training sequence $x(K_1), \ldots x(K_2)$.

To model the channel characteristic, channel coefficients $h_0, \ldots h_L$ are determined which specify the respective proportion of signal components with different amounts of delay in the total signal. L is the so-called channel memory. The channel coefficients are supplied to the channel equalizer 2 which equalizes the received data symbols $x(k)$ in accordance with the channel coefficients in order to obtain equalized data symbols u(1), . . . u(K).

Figure 3:
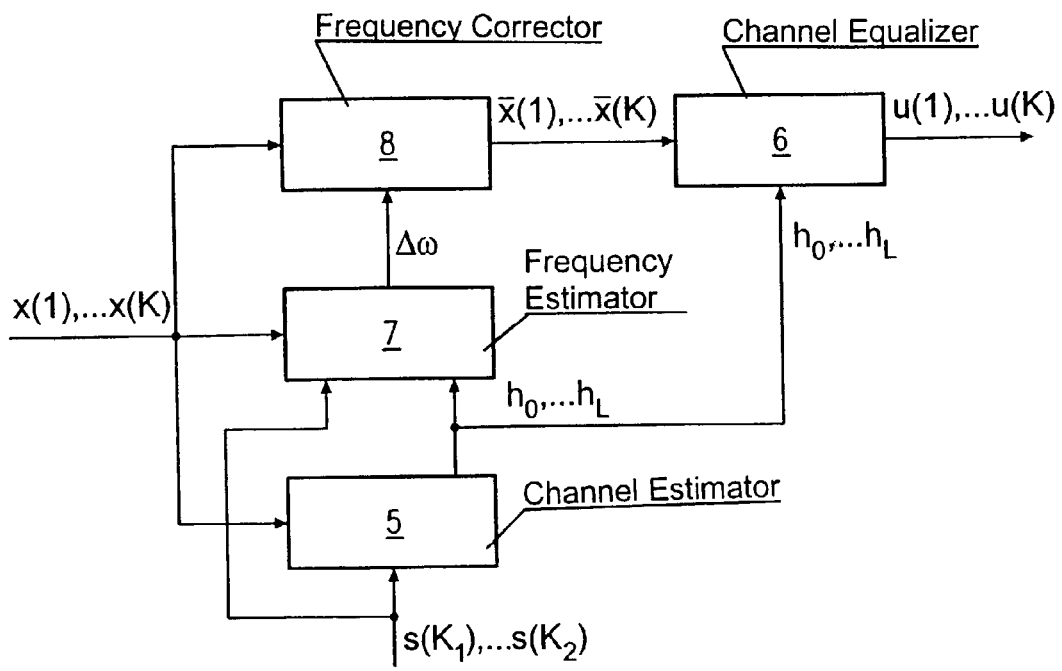
FIG. 3 is a block diagram of an overview of the receiving unit according to the invention with automatic frequency correction.

FIG. 3 shows an overview of the receiving unit modified in accordance with the invention. In addition to a channel estimator 5 and a channel equalizer 6, the receiving unit according to the invention contains a frequency estimator 7 and a unit for frequency correction 8.

The channel estimator 5 determines the channel coefficients $h_0, \ldots h_L$, which are supplied both to the channel equalizer 6 and to the frequency estimator 7, from the received data symbols x(k) and the known training symbols $s(K_1), \ldots s(K_2)$ of the undistorted training sequence. The channel estimator 7 calculates a frequency shift $\Delta\omega$ of the received data symbols from the received data symbols x(k), the known training symbols $s(K_1), \ldots s(K_2)$ of the undistorted training sequence and from the channel coefficients $h_0, \ldots h_L$.

The frequency shift $\Delta\omega$ determined by the frequency estimator 7 is supplied to the unit for frequency correction 8 which performs a phase correction of the received data symbols x(1), . . . x(K) in accordance with the frequency shift and generates phase-corrected data symbols $\bar{x}(1), \ldots \bar{x}(K)$.

The phase-corrected data symbols $\bar{x}(1), \ldots \bar{x}(K)$ still exhibit the intersymbol interference (ISI) characteristic of the transmission channel and, therefore, must be equalized by the channel equalizer 6 by the channel coefficients $h_0, \ldots h_L$. The equalized data symbols u(1), . . . u(K) appear at the output of the channel equalizer 6.

Figure 4:
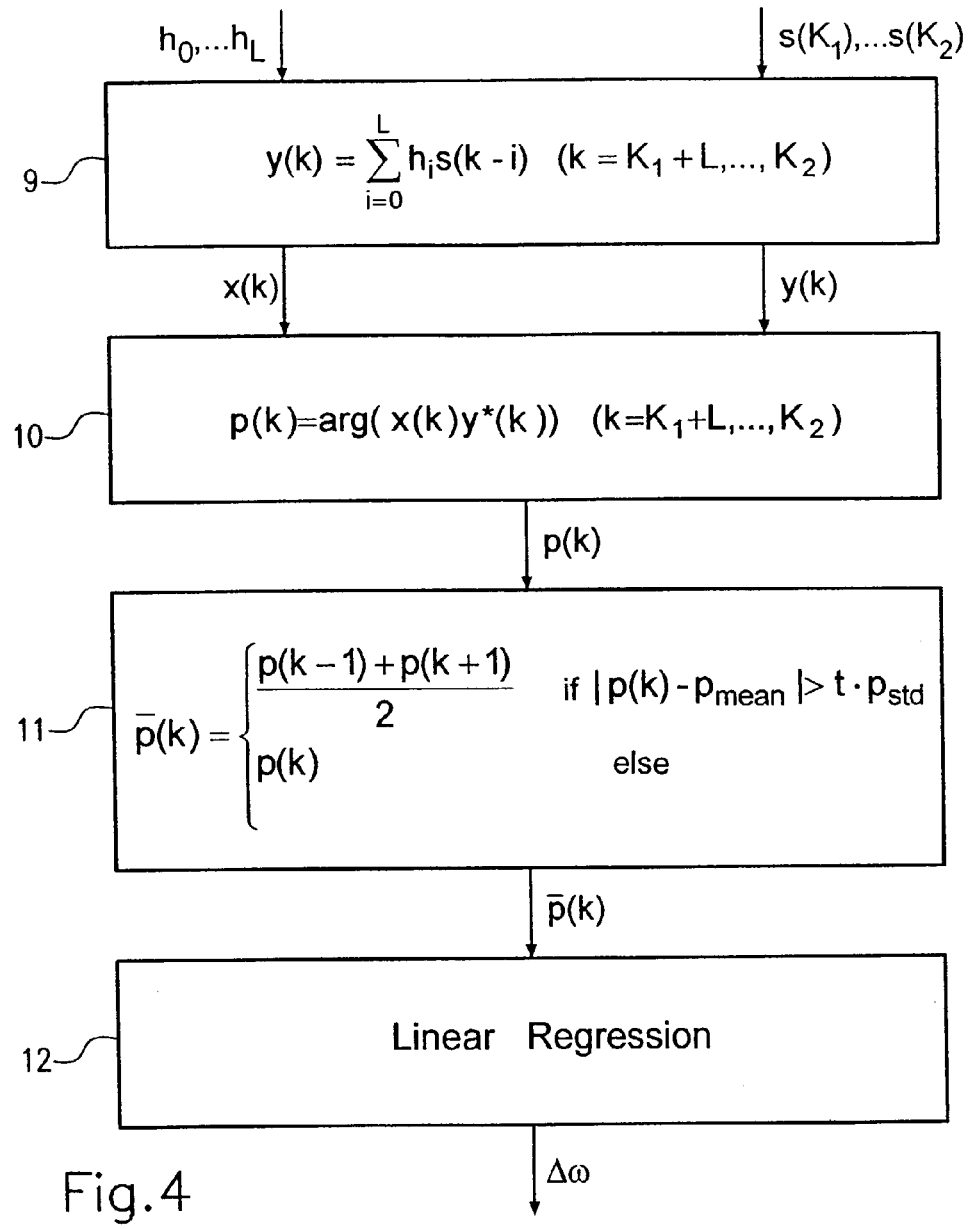
FIG. 4 is a flow chart according to the invention for determining a frequency shift $\Delta\omega$.

FIG. 4 will be used for describing how the frequency estimator 7 determines the frequency shift $\Delta\omega$ from the data symbols of the distorted and the undistorted training sequence and from the channel coefficients.

For this purpose, a frequency-error-free sequence of data symbols y(k) is calculated in a first step 9 called "remodulation". For this purpose, the training symbols $s(K_1), \ldots s(K_2)$ of the undistorted training sequence known to the frequency estimator 7 are considered. It is calculated how these known undistorted training symbols are distorted by the channel coefficients $h_0, \ldots h_L$. To carry out this calculation, the channel coefficients $h_0, \ldots h_L$ determined by the channel estimator 5 are used. The formula for calculating the distorted frequency-error-free data symbols y(k) is:

$$y(k) = \sum_{i=0}^{L} h_i \cdot s(k-i)$$

where $k=K_1+L, \ldots K_2$, or written out explicitly in full $$y(K_1 + L) = h_0 \cdot s(K_1 + L) + \ldots + h_L \cdot s(K_1)$$
$$\vdots \qquad \vdots$$
$$y(K_2) = h_0 \cdot s(K_2) + \ldots + h_L \cdot s(K_2 - L)$$

Exactly $(K_2-K_1+1)$ known training symbols $s(K_1), \ldots s(K_2)$ are available from which $(K_2-K_1-L+1)$ frequency-error-free data symbols $y(K_1+L), \ldots y(K_2)$ can be calculated because exactly $(L+1)$ values of s(k) must be taken into consideration for calculating each value of y(k) because of the channel memory L.

If there is no frequency error, the calculated frequency-error-free data symbols y(k) match the received data symbols x(k). If, in contrast, there is a frequency error, the phase of the frequency-error-free data symbols y(k) deviates from the phase of the received data symbols x(k) with frequency errors in a characteristic manner: the difference obtained between the two phases is a phase ramp, the slope of the phase ramp being defined by the frequency shift $\Delta\omega$.

Step 10 in FIG. 4 is used for determining the sequence of phase differences p(k) between the received data symbols x(k) and the calculated frequency-error-free data symbols y(k). The sequence of phase differences p(k) can be calculated by the following formula:

$$p(k) = arg(x(k) \cdot y^*(k)), k=K_1+L, \ldots K_2$$

$y^*(k)$ is here the complex conjugate of y(k). The operator arg( . . . ) in each case provides the phase of its complex argument.

At the end of step 10, a sequence of $(K_2-K_1-L+1)$ values of the sequence of phase differences p(k) is thus available. Experience has shown that, although the values of the sequence of phase differences p(k) found essentially reflect the phase variation, there are individual sequence values which deviate greatly and which should be ignored in the frequency estimation. One possibility would be to filter the phase function p(k) by a low-pass filter. However, it is more effective to perform a statistical smoothing of the phase function p(k) in the next step 11. For this purpose, the arithmetic mean $p_{mean}$ and the standard deviation $p_{std}$ of the sequence of phase differences p(k) are first calculated:

$$p_{mean} = \frac{1}{K_2 - K_1 - L + 1} \sum_{k=K_1+L}^{K_2} p(k)$$

$$p_{std} = \sqrt{\frac{1}{K_2 - K_1 - L + 1} \sum_{k=K_1+L}^{K_2} (p(k) - p_{mean})^2}$$

Following this, a test is carried out for each sequence value of the sequence of phase differences p(k) as to whether the deviation of the sequence value from the arithmetic mean, referred to the standard deviation, is greater than a predetermined threshold value t. If this is so, that is to say if $$\frac{|p(k) - p_{mean}|}{p_{std}} > t$$

the corresponding value p(k) is a runaway. The runaway value is then replaced by the mean of the preceding value p(k−1) and of the subsequent value p(k+1). If, in contrast, the predetermined threshold value t is not exceeded, the sequence value p(k) remains unchanged.

Thus, method step 11 supplies a smoothed sequence $\bar{p}(k)$ of phase differences in accordance with the following rule:

$$\bar{p}(k) = \begin{cases} \frac{p(k-1) + p(k+1)}{2} & \text{if } |p(k) - p_{mean}| > t \cdot p_{std} \\ p(k) & \text{else} \end{cases}$$

On the basis of this smoothed sequence $\bar{p}(k)$ of phase differences, the frequency shift $\Delta\omega$ can be determined in the next method step 12. To determine the slope of $\bar{p}(k)$ (with $k=K_1+L, \ldots K_2$), a linear regression analysis is performed in accordance with the method of least error squares. To simplify the notation, a sequence $$q(n) = \bar{p}(k-K_1-L)$$

with n=0, 1, ... N−1 is defined, where N=$K_2-K_1-L+1$ is the number of available sequence values of $\bar{p}(k)$.

To obtain the frequency shift $\Delta\omega$, the following system of linear equations must be solved:

$$\begin{bmatrix} \frac{N(N-1)(2N-1)}{6} & \frac{N(N-1)}{2} \\ \frac{N(N-1)}{2} & N \end{bmatrix} \begin{bmatrix} \Delta\omega \\ c \end{bmatrix} = \begin{bmatrix} \sum_{n=0}^{N-1} n \cdot q(n) \\ \sum_{n=0}^{N-1} q(n) \end{bmatrix}$$

With the calculation of the frequency shift $\Delta\omega$, the method steps 9 to 12 performed by the frequency estimators 7 are concluded.

As can be seen from FIG. 3, the frequency shift $\Delta\omega$ determined is supplied to the unit for frequency correction 8. The unit for frequency correction 8 corrects the phases of the received data symbols x(k) in order to compensate for the frequency shift $\Delta\omega$.

Figure 5:
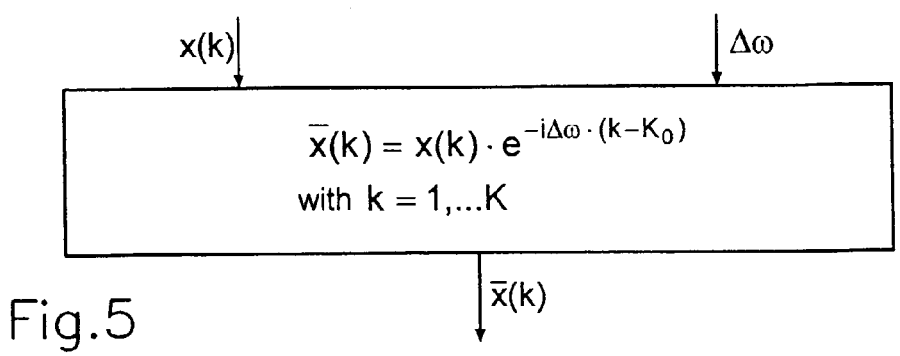
FIG. 5 is a block diagram showing how frequency correction according to the invention is performed.

This is shown in FIG. 5. The received data symbols x(k) are multiplied by a complex-valued sinusoidal signal of the frequency $\Delta\omega$:

$$\bar{x}(k) = x(k) \cdot e^{-i\Delta\omega \cdot (k-K_0)}, \; k=1, \ldots K$$

where $K_0$ is an index between $K_1$ and $K_2$. For $k=K_0$, the exponent of the complex-valued sinusoidal function becomes 0 and the phase of the sequence value $x(K_0)$ remains unchanged. For example, it is possible to select $$K_0 = \frac{K_1 + K_2}{2}$$

Since, as a rule, $\Delta\omega \ll 2\pi$ holds true, the remaining training symbols $x(K_1), \ldots x(K_2)$ belonging to the training sequence are also changed only slightly. This ensures that the channel estimation for determining the channel coefficients $h_0, \ldots h_L$, performed initially, can still be used.

Because $$e^{-i\Delta\omega \cdot k} = \cos(\Delta\omega \cdot k) - i \cdot \sin(\Delta\omega \cdot k)$$

the phase correction of the complex sequence x(k) can be performed using a sine/cosine coefficient table. Another possibility is to use the so-called CORDIC algorithm which is described in Published, Non-Prosecuted German Patent Application DE 199 48 899 A1, titled "Verfahren und Schaltungsanordnung zur digitalen Frequenzkorrektur eines Signals" [Method and Circuit Arrangement For The Digital Frequency Correction Of A Signal].

The unit 8 for frequency correction supplies a sequence of phase-corrected data symbols $\bar{x}(1), \ldots \bar{x}(K)$ which are still distorted by intersymbol interference. This sequence of phase-corrected data symbols $\bar{x}(1), \ldots \bar{x}(K)$ is supplied to the channel equalizer 6 which determines the equalized data symbols u(1), ... u(K) with the aid of the channel coefficients $h_0, \ldots h_L$. For the channel equalization, a trellis-based channel equalizer can be used which equalizes the phase-corrected data symbols $\bar{x}(1), \ldots \bar{x}(K)$ by the Viterbi method.

In the receiving unit according to the invention, an explicit automatic frequency correction of the received data symbols x(k) is thus performed after the channel estimation but before the channel equalization. Unlike in the prior art, it is not the received data symbols x(k) but rather the phase-corrected data symbols $\bar{x}(k)$ which are equalized. This makes it possible to significantly reduce the bit error rate of the equalized data symbols u(1), ... u(K).

I claim:

1. A receiving unit for mobile radio transmission, comprising:
    a channel estimator for determining channel coefficients $h_0, \ldots h_L$ for modeling a transmission channel, where L is a channel memory;
    a frequency estimation unit connected to said channel estimator, said frequency estimation unit determining a sequence of phase differences p(k) between received data symbols x(k) and frequency-error-free data symbols y(k) derived from a training sequence and determining a frequency shift $\Delta\omega$ of the received data symbols x(k) from the sequence of phase differences p(k), said frequency estimation unit performing in a case where a sequence value of the sequence of phase differences p(k) deviates from a mean value $p_{mean}$ of the sequence of phase differences by more than a predetermined threshold value, a smoothing of the sequence of phase differences p(k) by replacing the sequence value with a linear combination of a preceding sequence value p(k−1) and of a subsequent sequence value p(k+1), said frequency estimation unit further performing a linear regression analysis of the sequence of phase differences p(k) plotted against time and determining the frequency shift $\Delta\omega$ from a slope of the linear regression analysis;
    a frequency correction unit for correcting a phase of the received data symbols x(k) in dependence on the frequency shift $\Delta\omega$ resulting in phase-corrected data symbols $\bar{x}(k)$, said frequency correction unit connected to said frequency estimation unit; and
    a channel equalizer for equalizing the phase-corrected data symbols $\bar{x}(k)$ using the channel coefficients $h_0, \ldots h_L$ determined by said channel estimator, said channel equalizer connected to said channel estimator and to said frequency correction unit.

2. The receiving unit according to claim 1, wherein said frequency estimation unit generates the frequency-error-free data symbols y(k) by remodulation of undistorted training symbols $s(K_1), \ldots s(K_2)$ with the channel coefficients $h_0, \ldots h_L$, where $s(K_1)$ is a first training symbol and $s(K_2)$ is a last training symbol of the undistorted training sequence.

3. The receiving unit according to claim 2, wherein the remodulation of the training symbols $s(K_1), \ldots s(K_2)$ with the channel coefficients $h_0, \ldots h_L$ is effected in accordance with $$y(k) = \sum_{i=0}^{L} h_1 \cdot s(k-i)$$

with $k=K_1+L, \ldots K_2$, where $s(K_1)$ is the first training symbol and $s(K_2)$ is the last training symbol of the undistorted training sequence.

4. The receiving unit according to claim 1, wherein said frequency estimation unit generates the sequence of phase differences p(k) by evaluating a phase of expression $$\frac{x(k)}{y(k)}.$$

5. The receiving unit according to claim 1, wherein said frequency estimation unit generates the sequence of phase differences p(k) by evaluating a phase of an expression x*(k)·y(k) where x*(k) are complex conjugates of x(k).

6. The receiving unit according to claim 1, wherein said frequency correction unit corrects a phase of the received data symbols x(k) by multiplying x(k) by $e^{-i\Delta\omega \cdot k}$.

7. The receiving unit according to claim 1, wherein said frequency correction unit corrects a phase of the received data symbols x(k) by multiplying x(k) by $e^{-i\Delta\omega \cdot (k-K_0)}$ where $K_0$ is an index of a data symbol belonging to the training sequence.

8. The receiving unit according to claim 1, wherein the receiving unit decodes GMSK-modulated data symbols.

9. The receiving unit according to claim 1, wherein the receiving unit decodes 8-PSK-modulated data symbols.

10. The receiving unit according to claim 1, wherein the receiving unit decodes data symbols in an EDGE standard.

11. The receiving unit according to claim 1, wherein said frequency estimation unit generates the sequence of phase differences p(k) by evaluating a phase of expression $$\frac{y(k)}{x(k)}.$$

12. The receiving unit according to claim 1, wherein said frequency estimation unit generates the sequence of phase differences p(k) by evaluating a phase of an expression x(k)·y*(k), where y*(k) are complex conjugates of y(k).

13. A method for correcting a frequency error in a mobile radio transmission of data symbols, which comprises the steps of:
determining channel coefficients $h_0, \ldots h_L$ for modeling a transmission channel, where L is a channel memory;
determining a sequence of phase differences p(k) between received data symbols x(k) and a frequency-error-free data symbols y(k) derived from an undistorted training sequence;
determining a frequency shift $\Delta\omega$ of the received data symbols x(k) from the sequence of phase differences p(k) by the steps of:
smoothing the sequence of phase differences p(k) for a case where a sequence value of the sequence of phase differences p(k) deviates from a mean value $p_{mean}$ of the sequence of phase differences p(k) by more than a predetermined threshold value, a corresponding sequence value of the sequence of phase differences p(k) being replaced by a linear combination of a preceding sequence value p(k−1) and of a subsequent sequence value p(k+1) of the sequence of phase differences;
performing a linear regression analysis of the sequence of phase differences p(k) plotted against time;
determining the frequency shift $\Delta\omega$ from a slope obtained by the linear regression analysis performed;
correcting a phase of the received data symbols x(k) in dependence on the frequency shift $\Delta\omega$ resulting in phase-corrected data symbols $\bar{x}(k)$; and
equalizing the phase-corrected data symbols $\bar{x}(k)$ using the channel coefficients $h_0, \ldots h_L$ determined.

14. The method according to claim 13, which further comprises:
obtaining the frequency-error-free data symbols y(k) from the training symbols $s(K_1), \ldots s(K_2)$ of the undistorted training sequence by remodulation with the channel coefficients $h_0, \ldots h_L$ where $s(K_1)$ is a first training symbol and $s(K_2)$ is a last training symbol of the undistorted training sequence.

15. The method according to claim 14, which further comprises effecting the remodulation of the training symbols $s(K_1), \ldots s(K_2)$ with the channel coefficients $h_0, \ldots h_L$ in accordance with:

$$y(k) = \sum_{i=0}^{L} h_1 \cdot s(k-i)$$

with $k=K_1+L, \ldots K_2$, where $s(K_1)$ is the first training symbol and $s(K_2)$ is the last training symbol of the undistorted training sequence.

16. The method according to claim 13, which further comprises obtaining the sequence of phase differences p(k) between the received data symbols x(k) and the frequency-error free data symbols y(k) as a phase of expression $$\frac{x(k)}{y(k)}.$$

17. The method according to claim 13, which further comprises obtaining the sequence of phase differences p(k) between the received data symbols x(k) and the frequency-error-free data symbols y(k) as a phase of expression x*(k)·y(k), where x*(k) are complex conjugates of x(k).

18. The method according to claim 13, which further comprises performing a phase correction of a value of the received data symbols x(k) by multiplying x(k) by $e^{-i\Delta\omega \cdot k}$.

19. The method according to claim 13, which further comprises performing a phase correction of a value of the received data symbols x(k) by multiplying x(k) by $e^{-i\Delta\omega \cdot (k-K_0)}$, where $K_0$ is an index of a data symbol belonging to the undistorted training sequence.

20. The method according to claim 13, which further comprises demodulating the received data symbols x(k) in accordance with an 8-PSK standard.

21. The method according to claim 13, which further comprises demodulating the received data symbols x(k) in accordance with an EDGE standard.

22. The method according to claim 13, which further comprises demodulating the received data symbols x(k) in accordance with a GSMK standard.

23. The method according to claim 13, which further comprises obtaining the sequence of phase differences p(k) between the received data symbols x(k) and the frequency-error free data symbols y(k) as a phase of expression $$\frac{y(k)}{x(k)}.$$

24. The method according to claim 13, which further comprises obtaining the sequence of phase differences p(k) between the received data symbols x(k) and the frequency-error-free data symbols y(k) as a phase of expression x(k)·y*(k), where y*(k) are complex conjugates of y(k).

* * * * *